Patented July 10, 1951

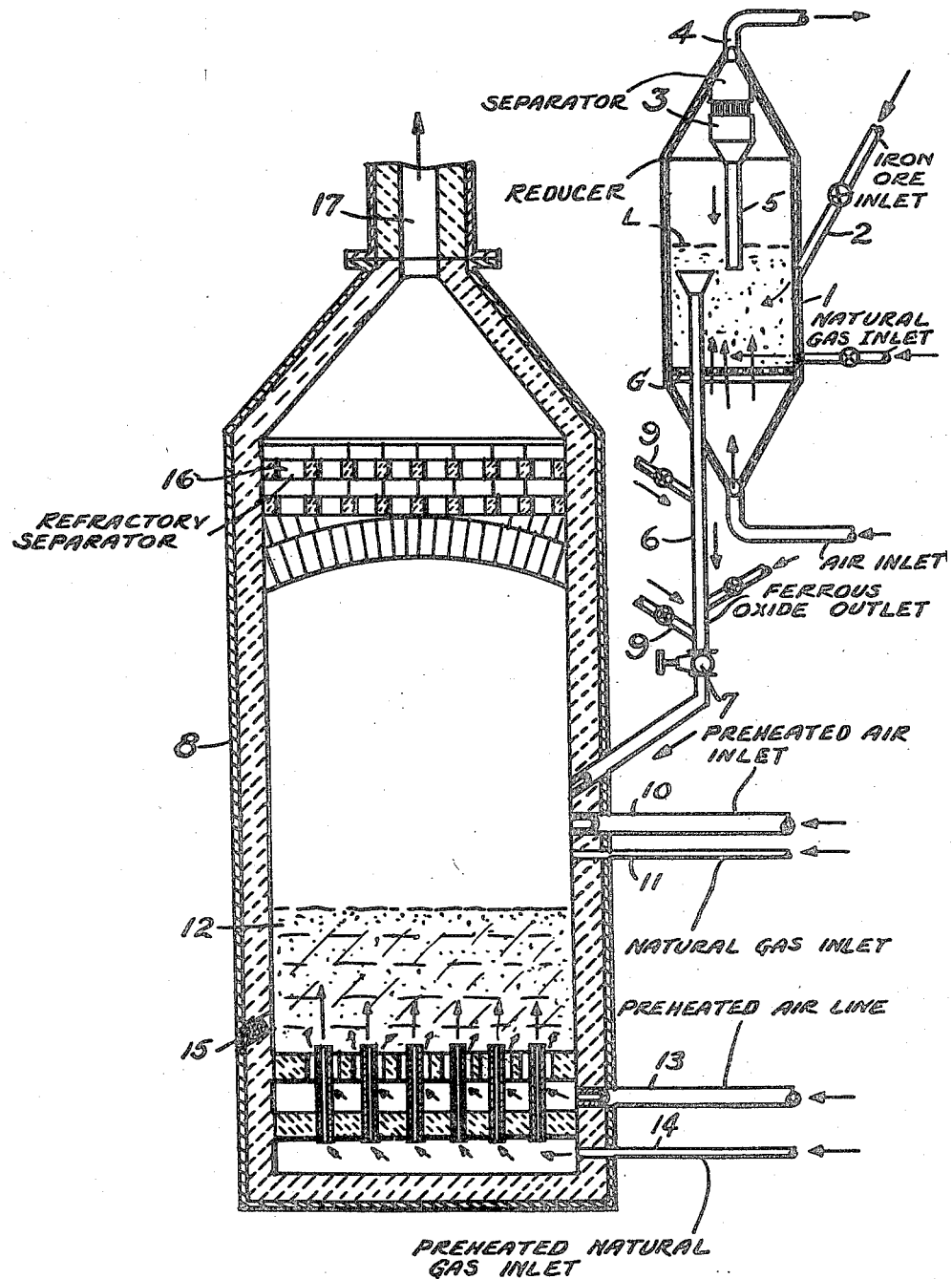

2,560,470

UNITED STATES PATENT OFFICE 2,560,470

REDUCTION AND MELTING OF ORES WITH GASEOUS FUEL

Henry J. Ogorzaly, Summit, N. J., assignor to Standard Oil Development Company, a corporation of Delaware Application February 12, 1948, Serial No. 7,910

2 Claims. (Cl. 75—40)

My present invention relates to improvements in the reduction and melting of oxide ores, and in particular it relates to the partial reduction of iron oxide ores to the ferrous oxide state while in the form of a fluidized bed, followed by melting of the ferrous oxide and reduction thereof to the metallic state while in liquid form.

In the conventional method of producing pig iron, a mixture of iron ore with coke and limestone is charged to the top of a blast furnace.

I have now discovered a cheaper method for producing molten iron, which at the same time avoids the introduction of carbon, sulfur and other deleterious components into the product. In brief compass, my invention involves reducing powdered or ground iron ore in the form of a fluidized bed of said powdered ore, with a suitable reducing gas but in the absence of added coke, to the ferrous oxide state, and thereafter heating the ferrous oxide in a gaseous atmosphere neutral in quality with respect to the oxidation or reduction of the ferrous oxide to melt the same, and accomplishing the reduction of the molten ferrous oxide to the metallic state, the latter operation being effected in the molten state by reaction with gases formed by partial combustion of a hydrocarbon fuel and without the use of added coke.

The main object of my present invention, therefore, is to smelt oxidic ores in a cheaper manner than has been previously possible.

Another object of my invention is to smelt oxidic ores without the necessity of providing a supply of metallurgical coke.

Other and further objects of my invention will appear from the following more detailed description and claims.

In the accompanying drawing, I have shown diagrammatically an apparatus layout in which my invention may be carried into effect.

Referring in detail to the drawing, I represents a fluid solids reducer into which iron ore ground to a size suitable for fluidization, which may be for example from 5 microns to ⅛ of an inch in diameter, is charged through line 2 by any conventional means. Simultaneously, air is caused to flow upwardly through a grid G, disposed in the bottom portion of the reducer, into the body of ore. At the same time a fuel such as methane, natural gas, ethane, or the like is introduced into the vessel I above the grid G to be partially burned by the air, generating heat within the fluid bed of ore and at the same time providing reducing gases ($CO$ and $H_2$) to effect partial reduction of the ore. The superficial velocity of the rising gases is maintained within such limits as to cause the formation of a dense, turbulent, fluidized mass of solids and gasiform material. This superficial velocity, which signifies the velocity of the gas were there no solids in the reducer, is maintained preferably within the limits of from ½ to 3 feet per second. Depending upon the superficial velocity of the upwardly flowing gasiform material and the actual amount of ore present in the reactor, the fluidized mass will have an upper dense phase level at some point L. Above the upper dense phase level L there is a disengaging space where from L to the top of the reducer the concentration of solids in gasiform material decreases sharply. The gasiform material eventually is rejected overhead from the reducer, but prior to that it is usually preferable to cause the gasiform material to pass through one or more centrifugal separators 3 wherein entrained solids are separated by centrifugal action and permitted to gravitate through dip pipes 5 (one shown) into the dense fluidized bed. The gasiform material substantially free of entrained solids is withdrawn from the reducer through line 4. The gases in line 4, still containing some reducing gas, may be recycled after removal of carbon dioxide and steam, or the said gas may preferably be used as a fuel.

I may prefer to recycle a stream of the ore undergoing reduction, withdrawing it through a standpipe and slide valve and returning it to the vessel through a gas lift provided by the injection into the riser of the air and fuel gas required to generate the reducing gas for the reduction vessel. This has the particular advantage of effectively mixing the air and fuel gas in a high velocity line containing suspended solids, which is a desirable method of preventing local overheating.

As to the conditions existing in the reducer I, the pressure is of the order of 1 atmosphere. The temperature prevailing in the said reducer is preferably in the range of 1300° F. to 1700° F. It will be understood that in order to maintain temperatures of the order just previously stated, it is preferred to generate hot reducing gas within the bed by partial combustion of fuel with an oxidizing gas such as air since a large amount of heat must be supplied to the reducing vessel. It will in general be impractical to attempt to supply this heat at the preferred temperature level by preheat in a separately produced reducing gas. The residence time of the ore in the reducer I is of the order of 5 minutes to 1 hour, depending on the porosity of the ore, the conditions of temperature prevailing in the reducer and the reducing power of the gaseous medium; in general residence times of less than one-half hour will be satisfactory. The reduction of the ore in the fluid bed is carried only to the ferrous oxide state rather than to the metallic state for several reasons. Among the advantages obtained are that undesirable agglomeration of the particles by sintering, such as would result in a loss of fluidization properties, is thereby avoided. It is not possible to reduce to the metallic state in a fluid bed at temperatures above 1100° F. because of such loss in fluidization properties, whereas in the present process it is possible to operate the fluid bed reducer at temperatures substantially in excess of this level, and this is required in order to successfully burn fuel gas at the temperature of the bed. At 1100° F. only a limited conversion of $CH_4$ for example would be obtained, while at 1500° F. conversion of $CH_4$ approaches completion. The higher temperature also provides a higher degree of preheat for the solid fed to the melting zone hereinafter described. The partially oxidized state of the solid and the higher temperature level also combine to greatly increase the degree of utilization of the reducing gas passing through vessel 1, so that the size of the vessel is reduced. Also the fact that the ore is not completely reduced permits a very much higher degree of utilization of the heat content in the fuel employed for melting the product of the fluid bed reduction, as will be hereinafter described.

The ferrous oxide is withdrawn from the reducer 1 through a drawoff pipe 6, controlled by valve 7, and discharged into the upper portion of a vessel 8. As usual, the pipe 6 is provided with a plurality of gas taps 9 into which slow currents of a neutral gas may be discharged for the purpose of increasing the flowability of the ferrous oxide therein.

There is simultaneously discharged into the upper part of the vessel 8, but below the point of introduction of the solid ferrous oxide, preheated air which enters through line 10 and mingles in a turbulent stream with hot gases rising from below as will be hereinafter explained. These gases rising from below contain substantial quantities of CO and $H_2$ and are strongly reducing with respect to ferrous oxide. By the interaction of these gases with air, the major part of the remaining CO and $H_2$ is burned generating a large amount of heat and resulting in a gaseous atmosphere which is neutral with respect to the oxidation or reduction of ferrous oxide. It may be desirable to introduce the air through a plurality of spaced points around the periphery and directed radially toward the central axis of the vessel 8; or it may be preferred to inject the air tangentially at one or more spaced points producing a vortex type of flow in order to facilitate mixing and interaction of the gas streams.

By the heat released through the interaction of the gases rising from below with the preheated air stream, the temperature of the air and of the solid ferrous oxide introduced through line 6 is raised to above 2500° F. and possibly up to 3000° F. It may on occasion be necessary to add an auxiliary fuel such as natural gas, methane, or other hydrocarbon fuel through line 11 to generate the required amount of heat. At this temperature level of 2500°–3000° F. the solid ferrous oxide particles are caused to melt and the liquid droplets thus formed in large part separate from suspension in the gas stream and gravitate toward the bottom of the vessel 8 where they are collected in a pool 12. The separation of the liquid droplets is facilitated by their high density, and by the fact that they tend to coalesce to droplets of large size by collision between droplets suspended in the turbulent gas mixture. If a cyclonic or vortex flow pattern is generated in the upper part of vessel 8 by tangential entry of the air through line 10, this also serves to aid the separation of the droplets of ferrous oxide by promoting their deposition on the walls of vessel 8. Because of the high temperature level and the small particle size of the solid ferrous oxide, the transfer of heat into the particles is extremely rapid, so that fusion occurs within a fraction of a second after the particles contact the hot gases in vessel 8.

The liquefied ferrous oxide collected in pool 12 is then further reduced to the metallic state by means of a gaseous reducing agent. Toward this end I introduce into the bottom of vessel 8 a preheated fuel such as natural gas, methane, or other hydrocarbonaceous fuel entering through line 14 and preheated air entering through line 13. These gases are then introduced through appropriate ports and conduits into the pool 12 below the surface of the liquid melt. The air and fuel gas are maintained in ratio such that by their interaction a gas of reducing nature relative to molten ferrous oxide is produced. At the same time sufficient heat is released to maintain the temperature of the liquid pool 12 above the melting point of iron, in the range of 2750° to 3000° F. The strongly reducing gas bubbling through the molten pool completes the reduction of the ferrous oxide to metallic iron which may be withdrawn in the liquid state through opening 15. The gasiform material rising from the pool 12 passes upwardly into the turbulent gaseous mixture in the upper portion of the retort vessel. The composition and quantity of the gas issuing from the pool will determine the amount of air and fuel added to the vessel through lines 10 and 11. In certain cases, it may be unnecessary to add fuel gas through line 11 for there may be sufficient combustible gas in the mixture issuing from the pool 12 to support the melting operation occurring in the upper portion of vessel 8.

The gases issuing from the vessel in the upper portion thereof are forced through a refractory separator 16. This separator contains passageways through which the gasiform material is forced causing the gasiform material to flow in circuitous and/or tortuous paths, thus causing entrained liquid droplets to be separated from the said gas, whereupon the latter is withdrawn from the system through line 17. The hot gases in line 17 may be forced through heat exchangers, waste heat boilers, etc., in order to recover their sensible heat in equipment not shown. In general the quantity of combustibles present will not be sufficient to justify utilization in secondary burners. The separated liquid droplets descend by gravity into the vessel 8 and pool 12.

In order to further describe the present invention and illustrate the manner of its working, there is now set forth a specific example based on the processing of a substantially gangue-free $Fe_2O_3$ ore. It will be understood that this is by way of illustration only and that the present process can also be readily adapted to the handling of gangue-containing ores.

In the following example all quantities are based on the processing of 3 tons of the said $Fe_2O_3$ ore. All flows are continuous in nature and the time interval covered depends on the scale of the operations. The said quantity of iron oxide is discharged into a fluid bed maintained at 1500° F. and atmospheric pressure, which is maintained in a dense turbulent condition by gases passing upwardly therethrough at about 1.5'/sec. superficial velocity. These gases are generated by the combustion of 46.5 moles of a natural gas containing 95% $CH_4$ with 240 moles of air both of which are introduced into the bed. The quantity of oxygen supplied with the air is insufficient for complete combustion of the natural gas and a mixture of CO, $CO_2$, $H_2$ and $H_2O$ with a small amount of residual $CH_4$ and the $N_2$ of the air is formed. At the same time a large amount of heat is released, sufficient to bring the solids and gases to the bed temperature and to supply the endothermic heat of reduction, as well as heat losses. In this example, the air and natural gas are supplied at about 100° F. The gaseous mixture produced by the partial combustion is strongly reducing to the $Fe_2O_3$ charge and at the same time oxidizing in nature with reference to metallic iron. At the temperature level in the reducing bed it rapidly converts the ore to FeO.

The FeO at 1500° F. is withdrawn through a standpipe and discharged into a melting zone maintained at 2700° F., through which passes a turbulent gas mixture which is neutral with regard to the oxidation or reduction of FeO at this temperature level. The solid particles of FeO are rapidly heated to the temperature of the melting zone and fuse into small liquid droplets, which in large part coalesce to large drops by collision and gravitate out of the gas stream into a liquid pool below the melting zone. The remaining small droplets of molten FeO entrained in the gas stream are separated out on passage through refractory checker-work and also returned to the liquid pool.

The molten pool is maintained at about 2900° F. by the partial combustion within the pool of 100 moles of natural gas with 346 moles of air. These gases are supplied with a preheat temperature of 1000° F. and 1900° F. respectively and are introduced below the liquid level in the pool. By their interaction a gaseous mixture of CO, $CO_2$, $H_2$ and $H_2O$ is formed which is strongly reducing to the molten FeO and causes the reduction thereof to molten metallic iron. The heat generated by the partial combustion of the natural gas is sufficient to maintain the pool substantially above the melting point of iron.

The gases leaving the pool, which are strongly reducing to FeO, vent into the melting zone. They are mixed in the lower part of this zone with 536 moles of air and 22 additional moles of natural gas, and the chemical interaction of these gases produces the gas mixture neutral to FeO, which is employed to melt the latter while in dilute suspension. Their reaction also provides the heat necessary to bring the FeO to fusion temperature and to meld the solid particles, as well as to supply unavoidable heat losses.

Approximately 2.1 tons of Fe are produced by the overall expenditure of 168.5 moles of natural gas corresponding to a consumption of 30,500 standard cubic feet of gas per ton of Fe. This quantity allows for very substantial heat losses and may well be reduced in large scale operation toward the theoretical minimum of about 17,000 standard cubic feet of natural gas per ton of iron.

To recapitulate briefly, I have devised a process for reducing iron ore to the metallic state and procuring said iron in molten form. My process involves two stages of reduction with gasiform reducing agents, the second stage being performed while the ore is in molten form. The iron thus produced will be substantially free of carbon, and if a silicon and phosphorus-free ore is charged, it will require little, if any, further refining to produce a steel satisfactory for many purposes. I deem it an advantage to be able to procure such a pure iron by a method which is substantially cheaper in fuel cost than the conventional blast furnace type of operation in many areas. In the latter type of operation, it is not possible to control the amount of carbon in the pig iron resulting from the smelting of ore, for the nature of the process is such that the pig iron thus produced will always contain a substantial amount of carbon.

Numerous modifications of my invention will occur to those who are familiar with this art. For example, although my invention has been described in terms of the processing of gangue-free ore, it will be readily understood that it is equally applicable to ores containing substantial amounts of gangue. In many cases such ores are self-fluxing, i. e., the gangue contains lime and silica in such ratio as to produce at pool temperatures a mobile, fluid slag which can be readily separated from the molten metal. In other cases, additions of lime to the melting zone may be required in order to adjust the characteristics of the slag. In general it is preferred to add lime to the melting zone as burned lime rather than limestone because of the added heat load imposed by the necessity of decomposing the limestone.

In the preceding description, the fuel gas and air employed for the final metallizing reduction in the liquid state have been shown as entering distributing chambers at the bottom of the vessel 8 and venting through appropriate ports and conduits into the bottom of pool 12, much in the manner of operating Bessemer converters. In many cases, however, it may be preferred to introduce these gases at a level somewhat above the bottom of pool 12, but still below the upper surface of the liquid pool, by means of radially-directed tuyères connecting with distributing mains or bustle pipes arranged in circular fashion around the vessel 8. This is particularly advantageous in the case of processing gangue-containing ores, since a quiescent zone is then formed in the liquid pool below the level of introduction of the air and fuel gas, and separation of molten slag from molten metal occurs in this lower zone of pool 12. Slag and metal may then be separately withdrawn.

Also it may in certain situations be considered advantageous to insert between the level of introduction of lines 10 and 11 and the upper surface of pool 12 a refractory packing providing a substantial amount of surface and permitting free countercurrent flow of liquid melt and hot reducing gases. Such refractory packing may, for example, consist of alumina or magnesia brick arranged in checker-work fashion. The air and fuel gas employed for the final metallizing reduction and corresponding to the streams introduced through lines 13 and 14 in Figure 1 may then be introduced into the gaseous space between the said refractory packing and the upper surface of liquid pool 12. In this case liquefied ferrous oxide formed in the upper part of vessel 8 and settling therefrom under the influence of gravity distributes itself on the refractory packing and flows downwards as a thin liquid stream of large surface area, which is swept by the rising stream of hot reducing gas formed by the interaction of the air and fuel gas introduced below the packing. Thereby reduction of the molten ferrous oxide to molten iron is effected. In this modification, pool 12 becomes simply a receiving pool for the final product.

Similarly, although in Figure 1 I have shown the refractory brick entrainment separator as located at the top of vessel 8, it will frequently be preferred for constructional reasons to install such refractory brick work in an annular zone concentric with the melting zone, and to cause the gases leaving the top of the melting zone to reverse their direction and flow downwards through said annular path containing refractory brick arranged in checker-work fashion, to facilitate the separation and recovery of entrained molten droplets. In other cases, it may be desired to install the entrainment separating means in a separate vessel from that containing the melting zone.

It will also be appreciated, with reference to the initial fluid bed reduction of oxide ore to the ferrous oxide state, that whereas I prefer to operate in the manner previously described in detail, making full use of the high temperature level permissible in partial reduction operations and of the cheap method of generating reducing gas which is thereby made possible, I do not intend to deny myself the possibility of providing by means other than those specifically described, a ferrous oxide charge to the melting and final reduction zone. Thus I may operate the fluid bed reducer at more moderate temperatures of the order of 1000° to 1300° F., employing in once-through or in recycle operation a reducing medium consisting of a preheated stream of hydrogen, producer gas, or other gasiform reducing agent prepared in separate equipment.

The above descriptions are in no wise to be construed as limitations. The present invention is fully defined and set forth in the following claims.

What is claimed is:

1. A continuous process for producing from iron ore a molten iron substantially free of carbon which comprises first partially reducing an oxidic iron ore in subdivided form in a primary stage by contacting the said ore in the form of a fluidized mass with a reducing gas containing hydrogen and carbon monoxide at temperatures of from about 1300°–1700° F. for a period of from about 5 minutes to one hour whereby the iron content of the said ore is reduced to the ferrous state, withdrawing the partially reduced ore from the primary stage, charging the substantially uncooled ore in the form of a fluidized column by gravity flow into a melting zone, contacting the said partially reduced ore with a hot neutral gas to form a suspension of said partially reduced ore in said gas and melting the partially reduced ore without effecting a change in the state of oxidation of said ore by maintaining the hot neutral gas at temperatures up to 2700° F., thereafter forming a pool of the molten partially reduced ore below the said melting zone by gravity separation of said molten ore from the said gaseous suspension, contacting said molten ore in said pool with a reducing gas containing hydrogen and carbon monoxide at elevated temperatures and recovering a substantially carbon-free metallic iron product in liquid state.

2. The method of claim 1 in which heat required to raise the partially reduced ore to the fusion temperature to melt the partially reduced ore is supplied by the limited combustion with an oxygen-containing gas of partially utilized reducing gas which has been previously employed to complete the reduction of the molten ferrous oxide to the metallic state.

HENRY J. OGORZALY.

REFERENCES CITED

The following references are of record in the file of this patent:

UNITED STATES PATENTS

| Number | Name | Date |
|---|---|---|
| 55,710 | Reese | June 19, 1866 |
| 350,574 | Wainwright | Oct. 12, 1886 |
| 410,430 | McCarty | Sept. 3, 1889 |
| 817,414 | Brown | Apr. 10, 1906 |
| 1,160,621 | Klepinger et al. | Nov. 16, 1915 |
| 1,160,822 | Beckman | Nov. 16, 1915 |
| 1,799,643 | Rogers | Apr. 7, 1931 |
| 2,035,550 | Karwat | Mar. 31, 1936 |
| 2,134,300 | Hodson et al. | Dec. 26, 1939 |
| 2,296,522 | Hartley | Sept. 22, 1942 |
| 2,449,635 | Barr | Sept. 21, 1948 |
| 2,477,454 | Heath | July 26, 1949 |
| 2,481,217 | Hemminger | Sept. 6, 1949 |
| 2,481,226 | Krebs | Sept. 6, 1949 |